United States Patent [19]

van den Elzen et al.

[11] 4,117,277
[45] Sep. 26, 1978

[54] ARRANGEMENT FOR SIMULTANEOUS TWO-WAY DATA TRANSMISSION OVER TWO-WIRE CIRCUITS

[75] Inventors: Hendricus Christianus van den Elzen; Petrus Josephus van Gerwen; Wilfred André Maria Snijders, all of Eindhoven, Netherlands

[73] Assignee: U.S. Philips Corporation, New York, N.Y.

[21] Appl. No.: 807,008

[22] Filed: Jun. 16, 1977

[30] Foreign Application Priority Data

Jun. 28, 1976 [NL] Netherlands ................. 7607037

[51] Int. Cl.² ............................................. H04B 3/20
[52] U.S. Cl. .............................. 179/170.6; 178/58 R
[58] Field of Search ............... 179/170.2, 170.4, 170.6, 179/170.8; 178/58 R, 50; 325/38 B; 307/222; 333/18 R

[56] References Cited

U.S. PATENT DOCUMENTS

| 3,821,494 | 6/1974 | Besseyre ........................ 179/170.6 |
| 3,894,200 | 7/1975 | Campanella et al. ............. 179/170.6 |
| 4,007,341 | 2/1977 | Sourgens et al. ................ 179/170.2 |
| 4,024,358 | 5/1977 | Virupaksha .................... 179/170.6 |

*Primary Examiner*—Thomas A. Robinson
*Attorney, Agent, or Firm*—Frank R. Trifari; Henry I. Steckler

[57] ABSTRACT

An arrangement for simultaneous two-way data transmission of data signals with a given symbol frequency over two-wire circuits of a type found in telephone networks or of a comparable type. The arrangement comprises an echo canceler with an adaptive filter for producing from transmit channel signals approximated echo signals which are differentially combined with receive channel signals for forming substantially echo-free residual signals. A special type of code conversion is employed in the transmit channel, whereby $p$-level data symbols are converted into modified $p$-level data symbols which are thereafter converted into $(2p-1)$-level data symbols. The echo canceler comprises a digital adaptive filter to which the modified $p$-level data symbols and the residual signals with a sampling frequency equal to the symbol frequency are supplied. These measures result in a transmission signal having favorable spectral properties, a simple inverse code conversion and an echo canceler which combines simplicity of implementation with favorable convergence properties.

8 Claims, 5 Drawing Figures

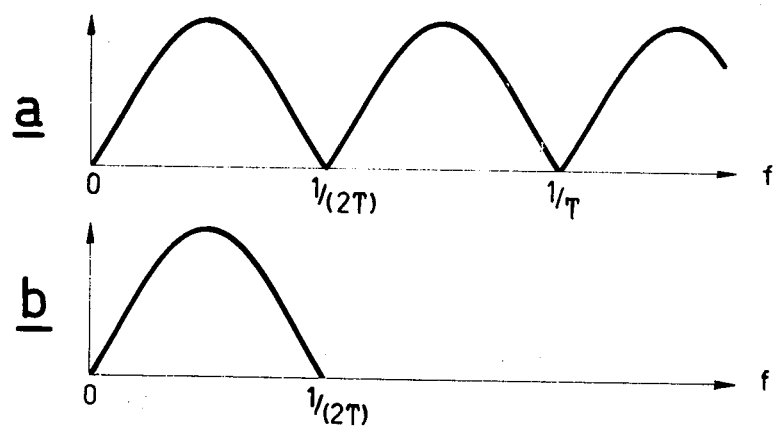
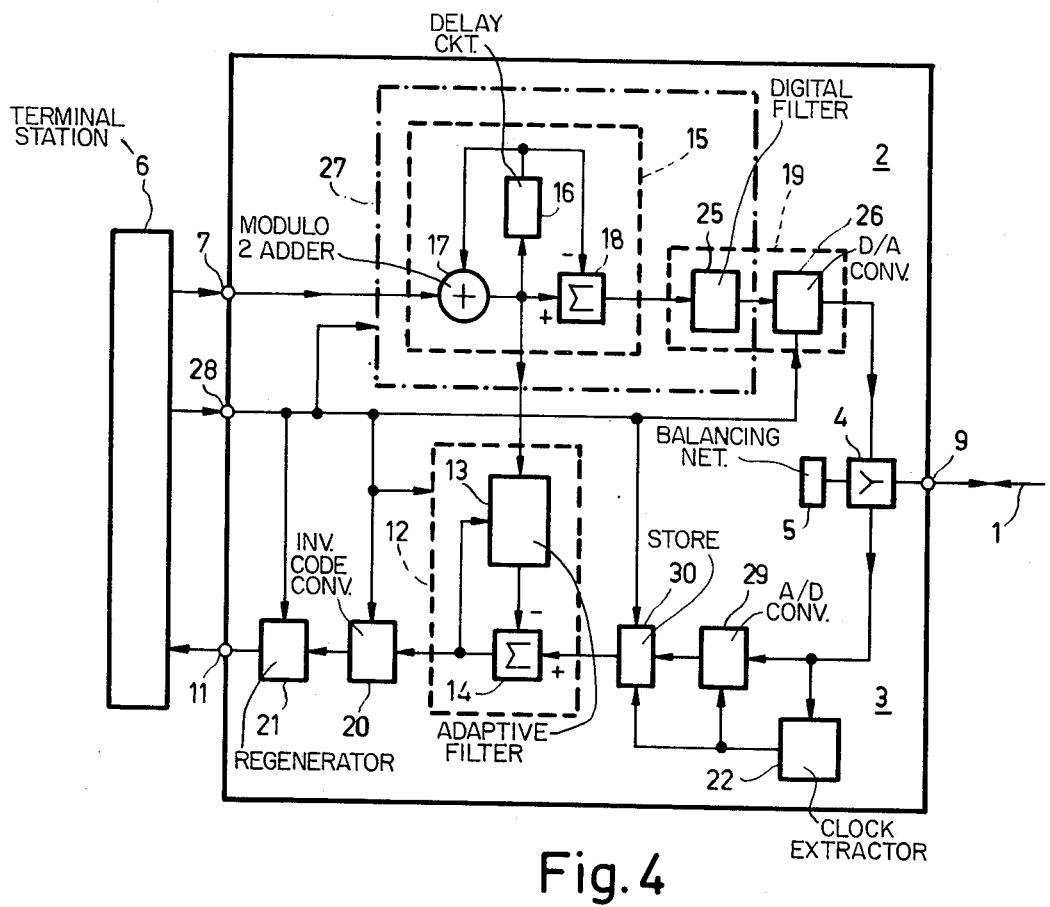
Fig. 4

ARRANGEMENT FOR SIMULTANEOUS TWO-WAY DATA TRANSMISSION OVER TWO-WIRE CIRCUITS

(A) BACKGROUND OF THE INVENTION (1) Field of the invention

The invention relates to an arrangement for simultaneous two-way transmission of data signals with a symbol frequency $1/T$ over circuits having a given bandwidth. Simultaneous two-way transmission in one and the same frequency band usually requires two separate one-way channels for which in the public telephone network use can be made of the four-wire circuits between junction exchanges. In most telephone networks, however, the circuits between subscriber and junction exchange are two-wire circuits, the local circuit between subscriber and terminal exchange being constituted by a nonloaded cable and the circuit between terminal exchange and juction exchange usually being constituted by a coil-loaded cable. The use of coil-loaded cables means that the available bandwidth of these two-wire circuits is restricted to approximately 3400 Hz. To enable simultaneous two-way transmission over such two-wire circuits both ends of these circuits comprise arrangements in which the one-way transmit channel and the one-way receive channel are connected to the two-wire circuit by means of a hybrid coupler (fork-circuit). These hybrid couplers are terminated by a balancing network for matching the cable impedance. In view of the varying length and types of cable the cable impedance is usually not precisely known so that the balancing network used in practice is a compromise network. This results in a direct leakage from transmit to receive terminal of the hybrid coupler. In addition, impedance discontinuities of the two-wire circuit result in signal reflections. Both effects result in echoes of the signals supplied at the transmit terminal of the hybrid coupler occuring at the receive terminal of this coupler. In voice transmission, the compromise balancing network is nearly always adequate to keep the level of the echoes within acceptable limits so that these echoes are not annoying provided their transit times do not become too long. In the case of long transit times the disturbing influence of the echoes can be considerably reduced by using an echo canceler in which approximated echo signals are produced from the signals at the transmit terminal of the hybrid coupler by means of an adaptive filter having adjustable filter coefficients, which approximated echo signals are subtracted from the signals at the receive terminal of this hybrid coupler to obtain residual signals which are substantially free from echoes. Adjusting the filter coefficients is usually based on a criterion for minimizing the mean-square error, the optimum adjustment being obtained in an iterative manner by means of a gradient algorithm.

The invention is the result of investigations into the possibilities of simultaneous two-way transmission of binary data signals at a rate of 6400 bits/s over two-wire circuits as they are found in the public telephone network if this network would be used as transmission facility for a public data network. However, the invention is not limited thereto as the same principles may be utilized for data signals having multi-level data symbols, for other data symbol rates and for other two-wire circuits of a comparable nature. Although the simultaneous two-way transmission of binary data signals at a rate of 6400 bits/s will be frequently mentioned hereinafter this should not be interpreted as a limitation of the range of utilization of the principles according to the invention.

(2) Description of the prior art

Reference (D.1) discloses an arrangement for simultaneous two-way transmission of data signals with a given symbol frequency over two-wire circuits in the public telephone network. This arrangement is provided with a one-way transmit channel, a one-way receive channel, a coupler for interconnecting said channels and the two-wire circuit and an echo canceler comprising an adaptive filter with adjustable filter coefficients for producing from signals in the transmit channel an approximated echo signal which is differentially combined with signals in the receive channel for forming a residual signal, said filter coefficients being adjusted under the control of the residual signal and the signals in the transmit channel for minimizing a prescribed function of the residual signal.

This prior art arrangement does not make use of the character of the data signals and the echo canceler used therein is fully independent of the modulation techniques used for the actual data transmission over the two-wire circuit. As regards implementation in analog or digital techniques and as regards operation this echo canceler therefore does not differ from the prior art echo cancelers which are used for voice transmission in the telephone network and which are, for example, described in references (D.2) and (D.3).

The upper limit for transmission over coil-loaded telephone cables (approximately 3500 Hz) may give rise to the thought that in the case of binary data signals (2-level data symbols) baseband transmission might be used for data rates up to approximately 6400 bits/s. The binary character of these data signals may then be utilized for realizing an attractive digital echo canceler in which the required multipliers are of a very simple implementation. However, both the two-wire circuits considered and the hybrid couplers usually employed therein comprise a number of transformers so that in case of baseband transmission the low frequencies in the spectrum of the binary data signals are suppressed. It is true that these low-frequency deficiencies as such can be corrected by applying quantized feedback in the receiver but in practice this technique does not offer a practical remedy because the frequency characteristic of the low-frequency suppression is not exactly known in view of the widely divergent numbers and types of transformers in the transmission path which increases the probability of cumulative errors in an inadmissible manner.

In the base of binary data signals it has already been suggested to avoid the problems caused by the transformers by utilizing one of the modulation methods which are known as "biphase modulation" and "delay modulation". The use of these two modulation methods results in binary (2-level) passband signals with little energy at the low frequencies and with many transitions between the two levels. Consequently, it is possible to use the simple digital echo canceler mentioned above, to permit transformers in the trasmission path and to recover the symbol frequency for regeneration in a rapid and simple manner. The great drawback of both modulation methods is the relatively large bandwidth the passband signal requires for the transmission of binary data signals at given data rates, or, put differently, the low relative data rate (date rate per Hz bandwidth) of the passband signal. As a consequence, it is not possible to transmit, by means of these modulation methods, binary data signals having a data rate of 6400 bits/s over the two-wire circuits in the public telephone network without removing the loading coils in the coil-loaded cable sections.

(B) Summary of the invention.

It is an object of the invention to provide an arrangement of the type mentioned above for simultaneous two-way transmission of data signals over a two-wire circuit having a given bandwidth, which arrangement permits using transformers in the transmission path and yet achieving a very high relative data rate and which arrangement utilizes the character of the data signals for realizing a simple structure of the echo canceler.

The arrangement according to the invention is characterized in that the transmit channel is provided with a code converter in which $p$-level data symbols are converted into modified $p$-level data symbols by adding modulo-$p$ the $p$-level symbols and modified $p$-level data symbols which are delayed over a time NT, where N is an integer, and in which modified $p$-level data symbols are converted into $(2p-1)$-level data symbols by linearly subtracting modified $p$-level data symbols which are delayed over a same time NT from the modified $p$-level data symbols, the receive channel being provided with an inverse code converter in which $(2p-1)$-level data symbols are converted into $p$-level data symbols whose levels are equal to the level modulo-$p$ in the $(2p-1)$-level data symbols, and the arrangement being furthermore provided with an extraction circuit coupled to the receive channel for recovering the symbol frequency from the signals in the receive channel and being also provided with a digital adaptive filter to which the modified $p$-level data symbols from the code converter in the transmit channel and signal samples of the residual signal occurring at sampling instants determined by the recovered symbol frequency are supplied for adjusting the filter coefficients.

(C) Short description of the drawing.

The invention and its advantages will be explained with reference to the drawing in which:

FIG. 3 shows some frequency diagrams for explaining the operation of the arrangement in FIG. 2;

FIG. 4 is a block diagram of a variant of the arrangement in FIG. 2;

(D) References (1) V. G. Koll et al., "Simultaneous Two-Way Data Transmission over A Two-Wire Circuit", IEEE Transactions, Vol. COM-21, No. 2, February 1973, pp. 143–147.

(2) M. M. Sondhi, "An Adaptive Echo Canceller", Bell Syst. Tech. J., Vol. 46, No. 3, March 1967, pp. 497-511.

(3) J. R. Rosenberger et al., "Performance of an Adaptive Echo Canceller Operating in a Noisy, Linear, Time-Invariant Enviroment", Bell Syst. Tech. J., Vol. 50, No. 3, March 1971, pp. 785–813.

(4) J. G. Proakis et al., "An Adaptive Receiver for Digital Signalling through Channels with Intersymbol Interference", IEEE Transactions, Vol. IT-15, No. 4, July 1969, pp 484–497.

(5) D. A. George et al., "An Adaptive Decision Feedback Equalizer", IEEE Transactions, Vol. COM-19, No. 3, June 1971, pp 281–293.

(6) U.S. Pat. No. 3,707,683.

(7) U.S. Pat. No. 3,590,386.

(8) L. R. Rabiner et al., "Terminology in Digital Signal Processing", IEEE Transactions, Vol. AU-20, No. 5, December 1972, pp. 322–337.

(E) Description of the embodiments.

(1) General description.

Figure 1:
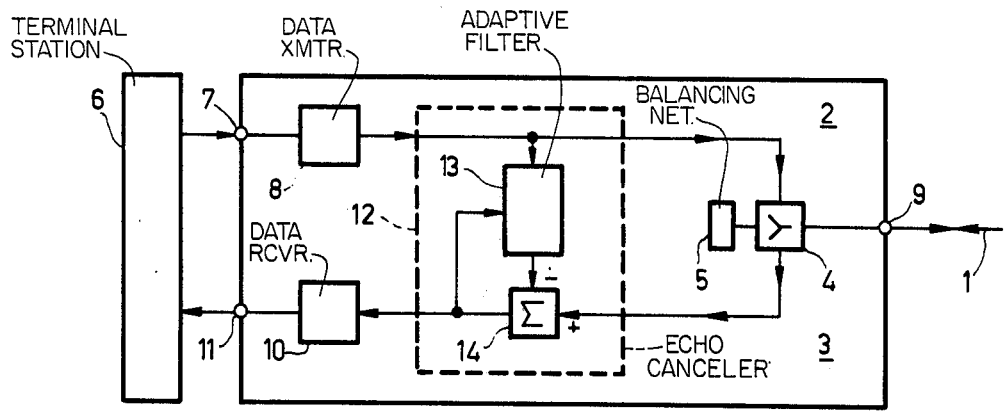
FIG. 1 is a block diagram of an arrangement in accordance with the above-mentioned prior art for simultaneous two-way data transmission over two-wire circuits.

FIG. 1 shows the block diagram of a prior art arrangement for simultaneous two-way transmission of data signals over a two-wire circuit 1 in the public telephone network which comprises both transformers and loading coils.

This arrangement is provided with a one-way transmit channel 2, a one-way receive channel 3, and a hybrid coupler 4 with a compromise balancing network 5 to interconnect these channels 2, 3 and two-wire circuit 1. The data signals derived from a terminal station 6 are supplied to an input 7 of transmit channel 2. Transmit channel 2 comprises a data transmitter 8 in which by means of known modulation methods such as phase modulation or vestigial sideband amplitude modulation a passband signal is produced which is suitable for transmission over two-wire circuit 1. This passband signal appears at a port 9 of coupler 4 and is transmitted through two-wire circuit 1 to a remote terminal station which is not shown in FIG. 1, but which is connected to two-wire circuit 1 in the same manner as terminal station 6. At port 9 there also appears a passband signal which is associated with the data signals derived from this remote terminal station and which is supplied to receive channel 3. Receive channel 3 comprises a data receiver 10 in which these data signals are recovered by means of demodulation methods corresponding with the modulation methods used in data transmitter 8. The recovered data signals appear at an output 11 of receive channel 3 and are transferred to terminal station 6.

As in practice the impedance of two-wire circuit 1 at port 9 is not exactly known, balancing network 5 does not constitute a perfect termination of hybrid coupler 4. This results in a direct leakage from transmit channel 2 to receive channel 3 through coupler 4. In addition, impedance discontinuities in two-wire circuit 1 result in signal reflections. Both effects cause echoes of the passband signal produced by data transmitter 8 to appear in receive channel 3.

In order to reduce the disturbing influence of these echoes as much as possible, the arrangement of FIG. 1 is provided with an echo canceler 12 which comprises an adaptive filter 13 with adjustable filter coefficients to produce an approximated echo signal from the passband signals in transmit channel 2. In a combining circuit 14 this approximated echo signal is subtracted from the signals in receive channl 3 (the passband signal associated with the data signals of the remote terminal station, noise or interference of a difference kind, and the echoes of the passband signal in transmit channel 2). At the output of combining circuit 14 there then appears a residual signal which is substantially free from echoes and which is applied to data receiver 10.

The filter coefficients of adaptive filter 13 are adjusted under the control of the residual signal and the passband signal in transmit channel 2 to minimize a prescribed function of this residual signal. Usually this prescribed function is the mean-square value of either the residual signal itself or an odd, non-decreasing function of the residual signal. The optimum adjustment of the filter coefficients is obtained in an iterative manner by means of a gradient algorithm.

The principles on which echo canceler 12 is based are the same as those on which the most current type of adaptive equalizer is based, which utilizes a criterion for minimizing the mean-square error for obtaining its optimum adjustment. Consequently, for the realization of echo canceler 12 use can be made of the known structures for this type of equalizer which are, for example, described in references (D.4) and (D.5). In most cases, adaptive filter 13 will be a non-recursive filter, preferably a transversal filter as in reference (D.4), but in the case of very long echo transmit times a recursive filter may also be used, as in reference (D.5).

In the prior art arrangement of FIG. 1 echo canceler 12 is fully independent of the modulation methods used in data transmitter 8 for the transmission over two-wire circuit 1. As regards implementation (analog or digital) and operation, this echo canceler therefore does not differ from the echo cancelers used for voice transmission in the telephone network and described in references (D.2) and (D.3).

Figure 2:
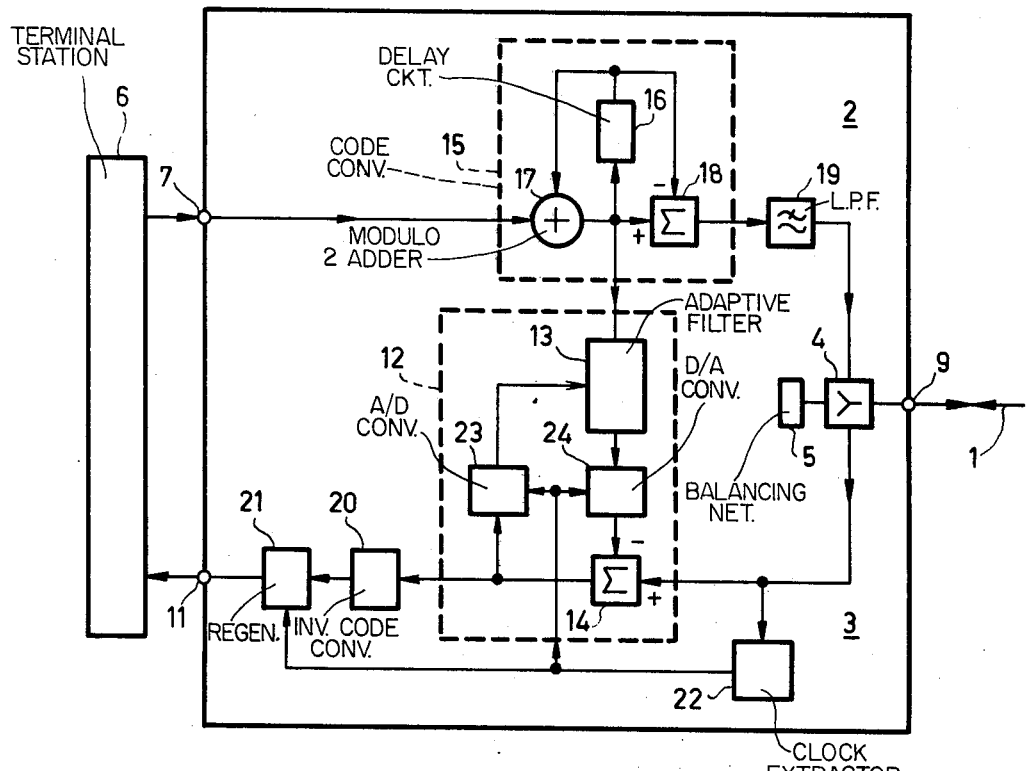
FIG. 2 is a block diagram of an arrangement in accordance with the invention for simultaneous two-way transmission over two-wire circuits.

(2) Description of FIG. 2.

FIG. 2 shows the block diagram of a first embodiment of the arrangement in accordance with the invention for transmission of binary (2-level) data signals. Elements in FIG. 2 corresponding with elements in FIG. 1 have been given the same reference numerals.

In FIG. 2, binary data signals with a symbol frequency 1/T are derived from terminal station 6 and are directly supplied to a code converter 15 in transmit channel 2. In this code converter 15 binary data symbols are converted into modified binary data symbols by means of a modulo-2 adder 17 in which the binary data symbols and modified binary data symbols, which have been delayed over a time NT by means of a delay circuit 16, where N is an integer, are added modulo-2. In addition, in this code converter 15 the modified binary data symbols are converted into ternary data symbols by means of a combining circuit 18 in which modified binary data symbols, which have been delayed over a time NT by means of a delay circuit 16, are linearly subtracted from the modified binary data symbols. The ternary data signals at the output of code converter 15 are supplied to coupler 4 via a lowpass filter 19. In receive channel 3, the signals entering via coupler 4 are supplied to an inverse code converter 20 (inverse as regards the conversion in code converter 15). In this inverse code converter 20, ternary data symbols are converted into binary data symbols whose levels are equal to the levels modulo-2 in the ternary data symbols. In this case inverse code converter 20 may be constructed as a fullwave rectifier. The binary data signals at the output of inverse code converter 20 are supplied to a regenerator 21 and the regenerated binary data signals are transferred to terminal station 6.

In addition, the arrangement in FIG. 2 is provided with an extraction circuit 22 coupled to receive channel 3 for recovering a clock signal of symbol frequency 1/T from the signals in this receive channel. The recovered clock signal is used inter alia for controlling regenerator 21.

Echo canceler 12 in FIG. 2 comprises a digital adaptive filter 13 whose filter coefficients are adjusted under the control of the modified binary data symbols at the output of modulo-2 adder 17 in code converter 15 and signal samples of the residual signal at the output of combining circuit 14 with a sampling frequency equal to the symbol frequency 1/T. The signal samples are obtained by means of an analog-to-digital converter 23 which is controlled by the clock signal of symbol frequency 1/T recovered in extraction circuit 22. The digital output signal of filter 13 is converted into the approximated echo signal by means of a digital-to-analog converter 24 which is also controlled by this recovered clock signal.

(3) Operation of the arrangement in FIG. 2.

By way of example, for explaining the operation of the device of FIG. 2, it is now assumed that binary data signals having a data rate of 6400 bits/s are derived from terminal station 6 so that the symbol frequency 1/T is equal to 6.4 kHz. Furthermore, the delay time NT of delay circuit 16 in code converter 15 is chosen to be equal to 2T.

If the data symbols occurring at instants $t = t_o + kT$, where $t_o$ is a reference instant and $k$ an integer, are indicated by means of a suffix $k$ at the relevant symbols, the signal processing in code converter 15 for converting binary data symbols $\{a_k\}$ into modified binary data symbols $\{b_k\}$ and for converting modified binary data symbols $\{b_k\}$ into ternary data symbols $\{c_k\}$ can be represented by the formulae:

$$b_k = (a_k + b_{k-2}) \text{ modulo } 2 \quad (1)$$

$$c_k = (b_k - b_{k-2}) \quad (2)$$

These formulae may be combined to the formula:

$$c_k = (a_k + b_{k-2}) \text{ modulo } 2 - b_{k-2} \quad (3)$$

which represents the conversion of binary data symbols $\{a_k\}$ into ternary data symbols $\{c_k\}$. In these formulae $a_k = 0$ or 1, $b_k = 0$ or 1, and $c_k = -1$ or 0 or 1.

The linear signal processing in accordance with formula (2) also results in a spectrum transformation with an amplitude-frequency characteristic:

$$A(f) = |1-\exp(-j4\pi fT)| = 2 |\sin(2\pi fT)| \quad (4)$$

as shown in frequency diagram $a$ of FIG. 3. The signal processing in accordance with formula (1) is a non-linear binary transformation which enables inverse code converter 20 to recover the original binary data symbols $\{a_k\}$ from the ternary data symbols $\{c_k\}$ by means of a very simple signal processing which can be represented on the basis of formula (3) by the formula:

$$a_k = (c_k) \text{ modulo } 2 \quad (5)$$

and which in this case is equivalent to full-wave rectifying.

The bandwidth of the ternary data signal at the output of code converter 15 is restricted by choosing the cut-off frequency of lowpass filter 19 equal to 1/(2T). Consequently, the output signal of transmit channel 2 has a spectrum as shown in frequency diagram $b$ of FIG. 3. This spectrum has a zero (or spectral null) at the frequency $f = o$ and little energy at the low frequencies located just above this frequency so that transformers may be admitted in two-wire circuit 1 and hybrid coupler 4. In addition, this spectrum has a zero (or spectral null) at the frequency $f = 1/(2T)$ and little energy at the high frequencies located just below this frequency so that also for the considered symbol frequency $1/T = 6.4$ kHz the loading coils can be maintained in two-wire circuit 1. Recovering the clock signal of symbol frequency 1/T from signals having such a spectrum can be done in known manner. In this case, extraction circuit 22 may be realized by utilizing the techniques described in reference (D.6). The transmission method applied in the arrangement of FIG. 2 consequently results in a high relative data rate, whereby 6400 bits/s data signals are transmitted in a bandwidth of 3200 Hz.

For explaining the operation of echo canceler 12 in FIG. 2, it is assumed that digital adaptive filter 13 is a transversal filter in which the output signal is produced by summing a series of delayed versions of the input signal weighted by a set of weighting factors, the successive delayed versions being spaced by a time T and the weighting factors constituting the filter coefficients. The general mathematical description and the resultant practical implementation of such an echo canceler 12 are known in themselves from reference (D.3). It may suffice here to refer to the likewise known fact that the control signals for adjusting the filter coefficients of the transversal filter can be obtained in practice by correlating the residual signal at the output of combining circuit 14 (or an odd, non-decreasing function of this residual signal) with each of the delayed versions of the input signal. This means that for calculating each output signal sample a large number of computational operations (multiplications and additions) per unit of time T must be performed in digital adaptive filter 13.

Due to the fact that the input signal of filter 13 in FIG. 2 is formed by the modified binary data symbols occurring with a symbol frequency 1/T at the output of modulo-2 adder 17 in code converter 15 the required multiplier in this filter 13 can be of a particularly simple structure. In addition, in this case no analog-to-digital converters are required to obtain input signal samples in digital form. Furthermore, the residual signal at the output of combining circuit 14 has a spectrum which substantially corresponds to the spectrum as shown in frequency diagram b of FIG. 3. On the basis of the known sampling theorem this residual signal can consequently be converted unambiguously by means of analog-to-digital converter 23 into a digital signal with a sampling frequency equal to the symbol frequency 1/T. Also the approximated echo signal at the input of combining circuit 14 need not have spectrum components above the frequency $f = 1/(2T)$ so that this signal can be represented unambigously by a digital output signal of filter 13 with a sampling frequency equal to the symbol frequency 1/T. As the number of computational operations per unit of time T and, consequently, the internal processing speed of this digital filter 13 are directly related to the sampling frequency of the signal samples, it is an important advantage for the practical realization of this filter 13 that this sampling frequency need not be higher than the symbol frequency 1/T. Consequently, in the arrangement of FIG. 2 the character of the binary data signal is used very efficiently to realize an attractively simple implementation of echo canceler 12.

Now the thought might arise that in echo canceler 12 of FIG. 2 the simplicity of structure is attained at the expense of a proper performance. For the operation of an echo canceler is based on the fact that the echoes may be considered as the output signal of an echo path having a given impulse response which is approximated as well as possible by the impulse response of the adaptive filter in the echo canceler connected parallel to the echo path. If the echo path between the output of transmit channel 2 and the input of receive channel 3 has an impulse response $h(t)$ and adaptive filter 13 an impulse response $g(t)$, then echo canceller 12 in the arrangement of FIG. 1 must ensure that the equation:

$$g(t) = h(t) \tag{6}$$

is satisfied as well as possible, but echo canceler 12 in the arrangement of FIG. 2 must ensure that the equation:

$$g(t) = a(t) * f(t) * h(t) \tag{7}$$

is satisfied as well as possible, where $a(t)$ is the impulse response associated with the linear signal processing in code converter 15 in accordance with formula (2), $f(t)$ is the impulse response of lowpass filter 19, and * indicates the convolution operation. Even if the observation is made that the impulse response $f(t)$ of lower pass filter 19 does substantially not affect the adjustment of adaptive filter 13 in echo canceler 12 of FIG. 2, because the residual signal is sampled at the symbol frequency 1/T in analog-to-digital converter 23, this does not alter the fact that adaptive filter 13 in FIG. 2 must also imitate the linear signal processing in accordance with formula (2).

The above might lead to the conclusion that by connecting the input of echo canceler 12 in FIG. 2 to the output of either lowpass filter 19 or code converter 15 the implementation of echo canceler 12 does become more complicated (in the first case an additional analog-to-digital converter is required to obtain input signal samples in the required digital form and the advantage of the very simple multipliers is completely lost, in the second case a coding circuit is required for converting the ternary data symbols into 2-bit input signal samples and the advantage of the very simple multipliers is also lost, albeit partly) but that then the performance of echo canceler 12, in particular as regards the speed with which the optimum adjustment of the filter coefficients is approached (the so-called convergence speed), will be better than with the manner of connecting echo canceler 12 as shown in FIG. 2.

Surprisingly it appeared, however, from extensive experiments that the above conclusion is incorrect and that the manner of connecting echo canceler 12 as shown in FIG. 2 does not only result in an echo canceler of the most simple structure, but that it also results in an echo canceler having the highest convergence speed. Theoretical and practical investigations into possible causes of this surprising result showed that the explanation must be found in the fact that, when echo canceler 12 is connected to the output of either lowpass filter 19 or code converter 15, the successive input signal samples are not mutually independent, but that they have a correlation which is determined by the linear signal processing in accordance with the formula (2), whereby the correlation processes to be performed in adaptive filter 13 for adjusting the filter coefficients is affected very unfavorably. All this results in that the iteration factor in the gradient algorithm for adjusting the filter coefficients, which iteration factor is highly determinant for the convergence speed, must be chosen, when connecting echo canceler 12 to the output of either lowpass filter 19 or code converter 15, about two times smaller than the iteration factor for echo canceler 12 connected in the manner shown in FIG. 2, the other circumstances being the same.

For completeness, it should be noted that there is little sense in connecting echo canceler 12 in FIG. 2 to the input of code converter 15, as adaptive filter 13 is a linear signal processing network which cannot imitate a non-linear signal processing in accordance with formula (1) without taking additional measures which would mean actually performing this nonlinear signal processing.

(4) Description of FIG. 4-

FIG. 4 shows the block diagram of a second embodiment of the arrangement according to the invention which second embodiment is a variant of the embodiment shown in FIG. 2. Elements in FIG. 4 corresponding with elements in FIG. 2 are indicated in FIG. 4 with the same reference numerals as in FIG. 2.

As regards transmit channel 2 FIG. 4 differs from FIG. 2 in that lowpass filter 19 is realized as a digital filter 25 to which a digital-to-analog converter 26 is connected to obtain the output signal of transmit channel 2 in an analog form. Although in FIG. 4 the components of code converter 15 and filter 25 are shown as separate components in order to identify the various functions in a sample manner, these functions can be combined in a manner known to those skilled in the art and performed in one digital signal processing circuit which in FIG. 4 is symbolically indicated by a block having reference numeral 27 in which the signal processing in accordance with formulae (1) and (2) as well as the signal processing required for calculating the output signal samples of filter 25 are performed. By way of example it is assumed in FIG. 4 that signal processing circuit 27 and digital-to-analog converter 26 are controlled by a clock signal of symbol frequency 1/T which is supplied by terminal station 6 to an input 28 of the arrangement.

As regards receive channel 3, FIG. 4 differs from FIG. 2 in that the signals which enter via coupler 4 are directly supplied to an analog-to-digital converter 29 which is controlled by the clock signal of symbol frequency 1/T recovered in extraction circuit 22. As a result the further signal processing in receive channel 3 and in echo canceler 12 can be done in a fully digital manner. Also by way of example it is assumed in FIG. 4 that this additional signal processing is done under the control of the clock signal supplied to input 28 by terminal station 6.

On account of the practically unavoidable phase differences between the clock signal recovered in extraction circuit 22 and the clock signal derived from terminal station 6 the output of analog-to-digital converter 29 in FIG. 4 is connected to an elastic storage device 30 in which the digital output signal of analog-to-digital converter 29 is stored at instants determined by the clock signal recovered in extraction circuit 22 and is read at instants determined by the clock signal at input 28 originating from terminal station 6.

The digital output signal of elastic storage device 30 is supplied in FIG. 4 to a fully digital echo canceler 12 with a digital combining circuit 14 for forming a digital residual signal. Consequently, in echo canceler 12 of FIG. 4 the analog-to-digital converter 23 and digital-to-analog converter 24 required in echo canceler 12 of FIG. 2 can be omitted. Furthermore, in FIG. 4 inverse code converter 20 is realized as a circuit for suppressing the sign of the digital residual signal and regenerator 21 is realized as a decision circuit which on the basis of the magnitude of the digital residual signal decides which of the two levels of the binary data signals must be transferred to terminal station 6.

As regards the principle of operation, the arrangement in FIG. 4 does not differ from the arrangement in FIG. 2, but the implementation of the arrangement according to FIG. 4 offers the advantage that imperfections such as inaccuracy and instability, which are hard to avoid when using analog circuits, are prevented by the use of the corresponding digital circuits.

For completeness reference is made to the possibility to have the entire signal processing in transmit channel 2, receive channel 3 and echo canceler 12 performed under the control of the recovered clock signal originating from extraction circuit 22. This may, for example, be effected by connecting terminal station 6 to the output of extraction circuit 22 so that the clock signal at input 28 fully corresponds with the recovered clock signal. In this case elastic storage device 30 is superfluous and may be omitted. In addition, it is possible to have the signal processing in receive channel 3 and echo canceler 12 performed under the control of the clock signal recovered in extraction circuit 22 and to have the signal processing in transmit channel 2 performed under the control of the clock signal originating from the terminal station 6. In that case an elastic storage device must be provided preceding the input of adaptive filter 13 which storage device is controlled in a manner similar as for elastic storage device 30 in FIG. 4 (which in that case can be omitted).

Figure 5:
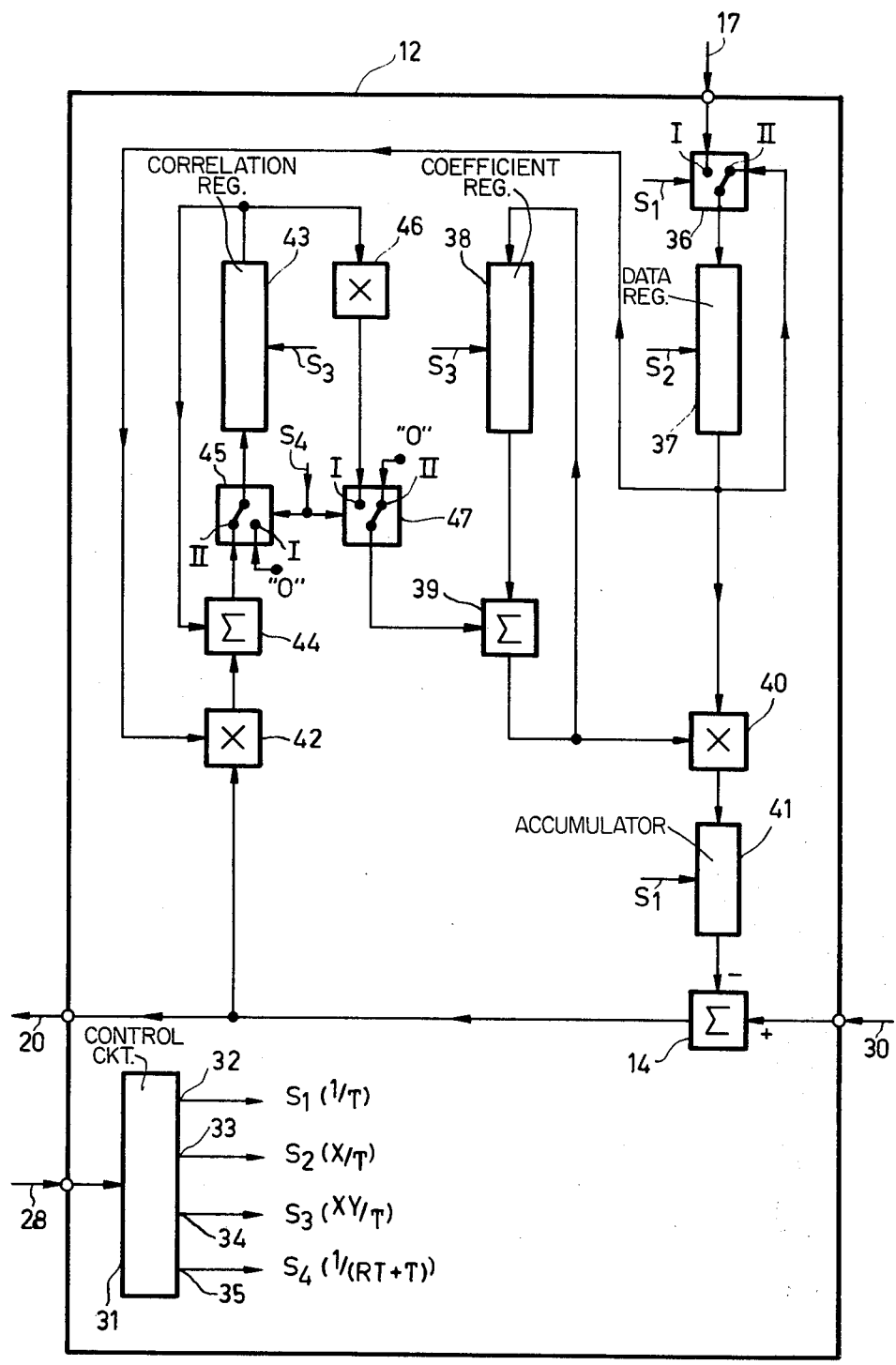
FIG. 5 is an embodiment of a digital echo canceler suitable for use in the arrangement of FIG. 2.

(5) Description of FIG. 5.

FIG. 5 shows the block diagram of an advantageous implementation of digital echo canceler 12 in FIG. 4. As the sampling frequency of the digital signals supplied to this echo canceler (the output signals of modulo-2 adder 17 and elastic storage device 30) is equal to the symbol frequency 1/T a sequential structure of echo canceler 12 is opted for in FIG. 5 which greatly simplifies the implementation, whereas the internal processing speed does not become extremely high.

For the description of FIG. 5 it is assumed that adaptive filter 4 in FIG. 4 is a transversal filter with X filter coefficients, each having Y bits, and that the correlation interval is equal to RT. As stated, echo canceler 12 is controlled by a clock signal of symbol frequency 1/T, originating from terminal station 6 and available at input 28. This clock signal at input 28 is supplied in FIG. 5 to a control circuit 31 generating the control signals required for the signal processing. Control circuit 31 has a plurality of outputs 32, 33, 34 and 35 at which there are available a control signal $S_1$ having a frequency 1/T, a control signal $S_2$ having a frequency X/T, a control signal $S_3$ having a frequency XY/T and a control signal $S_4$ having a frequency 1/(RT + T), respectively.

The transversal filter part of the echo canceler in FIG. 5 comprises a two-position switch 36 controlled by signal $S_1$ and a data register 37 controlled by signal $S_2$. At the beginning of each symbol period T signal $S_1$ moves switch 36 for a short moment to position I, whereby a sample of the modified binary data symbols is entered into data register 37. For the remainder of each symbol period T switch 36 is in position II in which the output of data register 37 is connected to its input so that data register 37 then functions as a circulating register, at the output of which the (X − 1) previous data samples and the new data sample appear successively at the frequency X/T. In addition, this transversal filter part comprises a coefficient register 38 in which the X filter coefficients are stored, each having Y bits in series form. Through a series adder 39 the output of coefficient register 38 is connected to its input. Coefficient register 38 is controlled by signal $S_3$ so that the filter coefficients also circulate therein at the frequency X/T.

The data samples at the output of data register 37 and the filter coefficients at the output of adder 39 are multiplied in a series multiplier 40 so that in each symbol period T there are produced X products at the output of this multiplier, which products are accumulated in a series accumulator 41 for forming a sample of the approximated echo signal. Accumulator 41 is controlled by signal $S_1$ in such a way that at the end of each symbol period T this sample of the approximated echo signal is subtracted from the output sample of elastic storage device 30 to form a sample of the residual signal at the output of combining circuit 14 and that thereafter the contents of accumulator 41 is reset to zero.

The correlator part of the echo canceler in FIG. 5 comprises a multiplier 42 connected to the outputs of combining circuit 14 and data register 37 and, in addition, a correlator register 43 in which X numbers are stored, each having Y bits in series form. Through a series adder 44 and a two-position switch 45 the output of correlator register 43 is coupled to its input. Correlator register 43 is controlled by signal $S_3$ and two-position switch 46 is controlled by signal $S_4$. In the absence of signal $S_4$ switch 45 is in position II in which adder 44 and correlator register 43 are interconnected and, consequently, constitute an accumulator. The data samples at the output of data register 37 and the residual signal sample at the output of combining circuit 14 are multiplied in multiplier 42 so that in each symbol period T there are produced X products, each having Y bits in series form, at the output of this multiplier, which products are added to the previous contents of correlator register 43 in adder 44.

In addition, in FIG. 5 the output of correlator register 43 is coupled to an input of adder 39 through a multiplier 46 with fixed multiplying factor and a two-position switch 47. Said multiplying factor is the iteration factor of the gradient-algorithm. Two-position switch 47 is controlled by signal $S_4$, switch 47 being in position II in the absence of signal $S_4$ in which position a value zero is supplied to adder 39.

After a correlation interval RT has ended $S_4$ moves switch 47 to position I for the duration of a symbol period T, whereby the X correlation results in correlator register 43, multiplied by the iteration factor, are added to the X filter coefficients in coefficient register 38 by means of adder 39 so that this latter register 38 contains a new set of filter coefficients at the end of this symbol period T. Signal $S_4$ moves switch 45 for the duration of this same symbol period T to position I in which a value zero is supplied to correlator register 43 so that the contents thereof is reset to zero at the end of this symbol period T.

The internal processing speed of echo canceler 12 in FIG. 5 is equal to XY/T. If the values 32 and 16 are allocated to X and Y, respectively, this results in an internal processing speed of approximately 3.3 MHz for a symbol frequency $1/T = 6.4$ kHz.

(6) General remarks.

In paragraph (E.3) it has already been mentioned that lowpass filter 19 in transmit channel 2 of FIG. 2 has substantially no influence on the adjustment of adaptive filter 13 in echo canceler 12. As regards the influence on the regeneration of the binary data signal in regenerator 21 the location of lowpass filter 19 in the transmission path between code converter 15 in transmit channel 2 at the one end of two-wire circuit 1 and inverse code converter 20 in receive channel 3 at the other end of two-wire circuit 1 is of no importance. Instead of including lowpass filter in transmit channel 2 a corresponding lowpass filter can be included in receive channel 3.

In addition, the explanation in paragraph (E.3) applies to binary data signals having a symbol frequency $1/T = 6.4$ kHz and to a delay time $NT = 2T$. For other values of the symbol frequency $1/T$, for example 3.2 kHz, a delay circuit 16 having a delay time $NT = T$ may be applied. Then the spectrum of the ternary data signals has the same shape as that in frequency diagram $a$ of FIG. 3, but the zeros are now situated at the frequencies $f = 0$ and $f = 1/T$, the latter frequency having, however, the same value as the frequency $f = 1/(2T)$ in the example of paragraph (E.3), namel 3.2 kHz. Then lowpass filter 19 in transmit channel 2 may have a cut-off frequency $1/(2T)$ but also a cut-off frequency $1/T$ or it may, as mentioned above, be dispensed with completely. In the two last cases, a simple lowpass filter is included in receive channel 3 to ensure that the first Nyquist criterion is approximately satisfied. However, in all cases the residual signal at the output of combining circuit 14 is sampled at the recovered symbol frequency 1/T.

In paragraph (A.2) it has already been mentioned that for binary data signals some advantages of the present arrangement can also be obtained by using the modulation methods which are known as "biphase modulation" and "delay modulation". An important additional advantage of the present arrangement is, however, that it can also be utilized, without changing its structure, for $p$-level data signals where $p$ exceeds 2, and that while maintaining all the advantages already mentioned, whereas the two known modulation methods can only be used for binary (2-level) data signals.

In the case of $p$-level data signals having a symbol frequency $1/T$, the signal processing to be performed in the code converter and the inverse code converter of the present arrangement can be represented for a delay time $NT = 2T$, analogous to the formulae (1), (2) and (5) given in paragraph (E.3), by the generalized formulae:

$$b_k = (a_k + b_{k-2}) \text{ modulo } p \tag{8}$$

$$c_k = (b_k - b_{k-2}) \tag{9}$$

$$a_k = (c_k) \text{ modulo } p \tag{10}$$

where $a_k$ as well as $b_k$ may assume one of the values from the series $0, 1, \ldots, (p-1)$ and $c_k$ may assume one of the values from the series $-(p-1), \ldots, -1, 0, 1, \ldots, (p-1)$. The linear signal processing in accordance with formulae (2) and (9) result in the same spectrum transformation with an amplitude-frequency characteristic given by formulae (4) so that the signals at the output of the code converter have the same spectral properties in both cases. For recovering the clock signal having the symbol frequency use can be made again of the techniques described in reference (D.6), whereas in certain cases also the techniques described in reference (D.7) may be used. The modified p-level data symbols obtained from the p-level data symbols by means of the non-linear p-level transformation in accordance with formula (8) are supplied to the adaptive filter in the echo canceler.

When the present arrangement is used for p-level data signals where p exceeds 2, not only its structure remains the same as for $p = 2$, but also the implementation of many component parts may remain the same. For example, the implementation of digital echo canceler 12 in FIG. 5 need only be modified in the sense that the samples of the modified 4-level data symbols are coded into 2 bits and that the parts processing the samples themselves (data register 37 and multipliers 40, 42) are arranged for 2-bit data samples. The remaining parts of echo canceler 12 in FIG. 5 and also the internal processing speed, however, need not be changed. Such an implementation of the present arrangement for $p = 4$ may, for example, be used when binary data signals must be transmitted at a rate of 12800 bits/s over two-wire circuits in the public telephone network. Then a series-to-parallel converter is connected to the input of the transmit channel converting the binary data signals into 4-level data signals having a symbol frequency 1/T of 6.4 kHz and a parallel-to-series converter is connected to the output of the receive channel converting the regenerated 4-level data signals into binary data signals having a rate of 12800 bits/s.

Furthermore it should be noted that the level of the signals entering the receive channel through the hybrid coupler may vary strongly from case to case (depending on the type and the length of the two-wire circuit these level variations may amount to approximately 40 dB). These level variations may be met by utilizing an automatic gain control at the input of the receive channel. For the embodiment shown in FIG. 2, however, another solution is possible which is attractive because of its simplicity. This solution consists in inserting a simple highpass filter having a cut-off frequency in the order of magnitude of 5 Hz between the inverse code converter 20 implemented as a full-wave rectifier and the regenerator 21. This highpass filter suppresses the DC voltage resulting from the full-wave rectification so that the decision level of regenerator 21 is now positioned at a reference potential zero and has become independent of the level variations at the input of the receive channel. Then the regenerator 21 may be constituted by a polarity detector, for example a slicer, and a decision circuit, for example a bistable trigger of the D-type controlled by the recovered clock signal. The sensitivity of the polarity detector then determines the limits of the range within which the decision circuit is independent of the level variations at the input of the receive channel. Thanks to this simple solution level variations up to approximately 50 dB can be met without the use of an automatic gain control. However, this solution requires that the binary data symbols occur in a substantially random succession, but in practice this condition constitutes no limitation because in general data scrambling is already applied to the data signal for other reasons. The digital equivalent of this solution can be utilized in the variant of FIG. 2 shown in FIG. 4.

Finally it should be noted that the present arrangement, true enough, performs an effective echo cancellation but that thereby the transfer characteristics of the actual transmission path including the two-wire circuit are not changed. If the amplitude and delay distortions caused by the transmission path assume intolerable levels, an automatic equalizer of a type described for instance in reference (D.4) or (D.5) may be inserted in the receive channel between the echo canceler and the inverse code converter.

What is claimed is:

1. An arrangement for simultaneous two-way transmission of data signals with a symbol frequency 1/T over a two-wire circuit having a given bandwidth, said arrangement comprising a one-way transmit channel, a one-way receive channel, a coupler means for interconnecting said channels and the two-wire circuit, an echo canceler comprising an adaptive filter means with adjustable filter coefficients for producing from signals in the transmit channel an approximated echo signal, means for differentially combining said echo signal with signals in the receive channel for forming a residual signal, said filter coefficients being adjustable under the control of the residual signal and the signals in the transmit channel for minimizing a prescribed function of the residual signal, the transmit channel comprising a code converter means for converting p-level data symbols into modified p-level data symbols including means for adding modulo-p the p-level data symbols and modified p-level data symbols which are delayed over a time NT, where N is an integer and means for converting modified p-level data symbols into $(2p-1)$-level data symbols including means for linearly subtracting said modified p-level data symbols which are delayed over a time NT from the modified p-level data symbols from said adding means, the receive channel comprising an inverse code converter means for converting $(2p-1)$-level data symbols into p-level data symbols whose levels are equal to the level modulo-p in the $(2p-1)$-level data symbols, and an extraction circuit means coupled to the receive channel for recovering the symbol frequency from the signals in the receive channel; said adaptive filter comprising a digital adaptive filter having input means for receiving the modified p-level data symbols from the code converter in the transmit channel and signal samples of the residual signal occurring at sampling instants determined by the recovered symbol frequency and means for adjusting the filter coefficients.

2. An arrangement as claimed in claim 1, wherein said transmit channel further comprises a low pass filter coupled between said code converter means and said coupler means.

3. An arrangement as claimed in claim 2, wherein said low pass filter comprises a digital filter coupled to said code converter means and a digital to analog converter coupled to said digital filter and to said coupler means.

4. An arrangement as claimed in claim 1, wherein said receive channel further comprises an inverse code converter coupled to said echo canceler and a regenerator coupled to said inverse code converter.

5. An arrangement as claimed in claim 4, wherein said inverse code converter comprises a full wave rectifier.

6. An arrangement as claimed in claim 4, wherein said inverse code converter comprises a sign suppression circuit.

7. An arrangement as claimed in claim 1, wherein said receive channel further comprises an elastic store coupled to said echo canceler.

8. An arrangement as claimed in claim 1, wherein said echo canceler comprises a data register; a first switch coupled to said register and to said modulo $p$ adding means; a first multiplier having a first input coupled to said register, a second input, and an output; an accumulator coupled to said output; a first adder having an inverting input coupled to said accumulator, an input coupled to said receive channel, and an output coupled to said receive channel, a second multiplier having inputs coupled to said first adder output and said data register respectively, a second adder coupled to said second multiplier, a second switch coupled to said second adder, a correlation register coupled to said second switch and to said second adder; a third multiplier coupled to said correlation register; a third switch coupled to said third multiplier, a third adder coupled to said third switch and to said first multiplier second input; and a coefficient register coupled to said third adder.

* * * * *